United States Patent [19]

Holub et al.

[11] 4,122,061

[45] Oct. 24, 1978

[54] IMPACT MODIFIED POLYESTER COMPOSITIONS

[75] Inventors: Frederick Frank Holub, Schenectady, N.Y.; Phillip Steven Wilson, Mt. Vernon, Ind.

[73] Assignee: General Electric Company, Pittsfield, Mass.

[21] Appl. No.: 753,880

[22] Filed: Dec. 23, 1976

[51] Int. Cl.² ............................ C08K 3/32; C08K 3/36; C08L 67/02
[52] U.S. Cl. ................................. 260/40 R; 260/860; 260/873
[58] Field of Search ...................... 260/860, 873, 40 R

[56] References Cited

U.S. PATENT DOCUMENTS 3,953,394  4/1976  Fox et al. .......................... 260/860 X

*Primary Examiner*—Sandra M. Person
*Attorney, Agent, or Firm*—Morgan, Finnegan, Pine, Foley & Lee

[57] ABSTRACT

Reinforced, impact modified thermoplastic polyester compositions are provided which comprise a poly(1,4-butylene terephthalate) resin, a poly(ethylene terephthalate) resin, a fibrous glass reinforcement alone or in combination with a mineral reinforcing filler and, as an impact modifier therefor, a polyolefin or olefin based copolymer resin. The polyolefinic impact modifier is easily dispersed in the compositions and provides significantly improved impact strength in surprisingly small amounts, in comparison with corresponding compositions which are unmodified.

13 Claims, No Drawings

IMPACT MODIFIED POLYESTER COMPOSITIONS

This invention relates to reinforced thermoplastic polyester compositions which are moldable to articles of improved impact strength. More particularly, the invention pertains to glass fiber reinforced compositions of a poly(1,4-butylene terephthalate) resin and a poly(ethylene terephthalate) resin which are impact modified with a relatively minor, effective amount of a polyolefin or olefin based copolymer resin.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly (ethylene terephthalate) has become an important constituent of injection moldable compositions. Poly(1,4-butylene terephthalate), becuase of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

It has now been discovered that reinforced blends of poly(1,4-butylene terephthalate) and poly(ethylene terephthalate) can be impact modified with the addition of a polyolefin or olefin based copolymer resin. The polyolefinic resin is easily dispersed into the polyester blend and results is greatly improved impact strength in the molded article in surprisingly small amounts. The heat distortion temperature is also enhanced.

DESCRIPTION OF THE INVENTION

According to this invention, there are provided reinforced thermoplastic composition which are useful for molding, e.g., injection molding, compression molding, transfer molding, and the like, the compositions having improved impact strength after molding, comprising:
 (a) a thermoplastic polyester composition comprising, in intimate admixture, a poly(1,4-butylene terephthalate) resin, a poly(ethylene terephthalate) in resin and a reinforcing amount of a reinforcing agent therefor comprising fibrous glass alone or in combination with a mineral reinforcing filler, and
 (b) a minor amount of an impact modifier therefor comprising a polyolefin or olefin based copolymer resin, said resin being present in an amount at least sufficient to provide improved impact strength in comparison with a corresponding composition which does not contain said polyolefinic resin.

In preferred compositions, the polyolefin or olefin based copolymer will be selected from (i) polyethylene; (ii) propylene-ethylene copolymer; (iii) ethylene-vinyl acetate copolymer; or (iv) a mixture of any of the foregoing.

The polyester resins of the compositions of this invention are available commercially or can be prepared by known techniques such as by the alcoholysis of esters of terephthalic acid with ethylene glycol or butane diol and subsequent polymerization, by heating the glycols with the free acids or with halide derivatives thereof, and similar processes. These are described in U.S. Pat. Nos. 2,465,319 and 3,047,539, and elsewhere.

Illustratively, these high molecular weight polyesters will have an intrinsic viscosity of at least about 0.4 deciliters/gram and preferably, at least 0.6 deciliters/gram as measured in a 60:20 phenol/tetrachloroethane mixture at 30° C.

Especially useful when high melt strength is important are branched high melt viscosity poly(1,4-butylene terephthalate) resins, which include a small amount, e.g., up to 5 mole percent based on the terephthalate units, of a branching component containing at least three ester forming groups. The branching component can be one which provides branching in the acid unit portion of the polyester, or in the glycol unit portion, or it can be hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of limealuminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 and 0.250 inch.

The reinforcing agent can also comprise, in addition to a fibrous glass reinforcement, a mineral reinforcing filler. Merely by way of illustration, the mineral reinforcement can comprise a clay, talc, quartz, mica, calcium silicate, titanium dioxide, and the like, Preferably, talc or α-quartz is used.

The amount of the reinforcing agent can vary widely depending on the formulation and needs of the particular composition, it being essential only that an amount is selected which is at least sufficient to provide reinforcement. Preferably, however, the reinforcing agent will comprise from about 1 to about 60% by weight of fibrous glass and from 0 to about 60% by weight of the mineral reinforcing filler, based on the combined weights of (a) and (b).

It has been found that even relatively minor amounts of the polyolefin or olefin based copolymer resin (b) are effective in providing significant improvements in impact strength. In general, the polyolefinic resin will be present in amounts of at least about 1% by weight, preferably from about 1 to about 5% by weight of (a) and (b). With amounts in excess of 5% by weight, some reduction in heat distortion temperature may be experienced.

Other ingredients, such as dyes, pigments, flame retardants, drip retardants, and the like can be added for their conventionally employed purposes.

The compositions of this invention can be prepared by a number of procedures. In one way, the reinforcement, e.g., glass fibers, and, optionally, mineral filler, is put into an extrusion compounder with the resinous components to produce molding pellets. The reinforcement is dispersed in a matrix of the resin in the process. In another procedure, the reinforcement is mixed with the resins by dry blending, then either fluxed on a mill and comminuted, or they are extruded and chopped. The reinforcing agent can also be mixed with the resins and directly molded, e.g., by injection or transfer molding techniques.

It is always important to thoroughly free all of the ingredients; resin, reinforcement and any optional, conventional additives from as much water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyester and polyolefin resins and the reinforcing agent, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°-525° F. and conventional mold temperatures, e.g. 130°-150° F.

DESCRIPTION OF THE PREFERRED EMBODIMENTS

The following examples illustrate the invention. They are set forth as a further description but are not to be construed as limiting the invention thereto.

EXAMPLES 1-11

Dry blends of poly(1,4-butylene terephthalate) resin (PBT), intrinsic viscosity 1.05 dl/g., melt viscosity 6,200 poise, poly(ethylene terephthalate) (PET), intrinsic viscosity 0.62 dl/g., 3/16 inch glass fibers, talc, a polyolefin or olefin based copolymer resin and diphenyl decyl phosphite are compounded and extruded at 520° F. (mold temperature 130° F.). The formulations and physical properties are shown in Table 1.

TABLE 1

| EXAMPLE NO. | 1 | 2 | 3 | 4 | 5 | 6 | 7 | 8 | 9 | 10 | 11 | Control |
|---|---|---|---|---|---|---|---|---|---|---|---|---|
| Composition (parts by weight) | | | | | | | | | | | | |
| PBT | 42.5 | 40 | 42.5 | 40 | 44 | 42.5 | 45 | 42.5 | 45 | 42.5 | 45 | 45 |
| PET | 30 | 30 | 30 | 30 | 30 | 30 | 30 | 30 | 30 | 30 | 30 | 30 |
| Glass fibers, 3/16" | 10 | 10 | 10 | 10 | 10 | 10 | 10 | 10 | 10 | 10 | 10 | 10 |
| Talc$^a$ | 15 | 15 | 15 | 15 | 15 | 15 | 15 | 15 | 15 | 15 | 15 | 15 |
| Diphenyl decyl phosphite | .05 | .05 | .05 | .05 | .05 | .05 | .05 | .05 | .05 | .05 | .05 | .05 |
| Polyethylene$^b$ | 2.5 | 5 | — | — | — | — | — | — | — | — | — | — |
| Polyethylene$^c$ | — | — | 2.5 | 5 | 1 | — | — | — | — | — | — | — |
| Propylene-ethylene copolymer$^d$ | — | — | — | — | — | 2.5 | 5 | — | — | 1.25 | 2.5 | — |
| Ethylene Vinyl-acetate copolymer$^e$ | — | — | — | — | — | — | — | 2.5 | 5 | 1.25 | 2.5 | — |
| $^a$about 3-10 microns diameter | | | | | | | | | | | | |
| $^b\rho=0.924$, MI=5 | | | | | | | | | | | | |
| $^c\rho=0.924$, MI=260 | | | | | | | | | | | | |
| $^d\rho=0.895$, MI=2.5 | | | | | | | | | | | | |
| $^e$25% Vinyl Acetate, MI=19 | | | | | | | | | | | | |
| (MI=Melt Index, ASTM D1238) | | | | | | | | | | | | |
| Properties | | | | | | | | | | | | |
| Heat Distortion Temp.,° F. at 264 psi | 385 | 374 | 382 | 380 | 370 | 378 | 373 | 376 | 372 | 380 | 370 | 365 |
| Notched Izod impact, ft.lbs./in. | 1.2 | 1.2 | 1.1 | 1.1 | 1.2 | 1.0 | 1.0 | 1.1 | 1.0 | 0.9 | 1.0 | 0.9 |
| Unnotched Izod impact, ft.lbs./in. | 9.1 | 9.3 | 8.2 | 8.0 | 8.0 | 8.7 | 8.9 | 8.9 | 9.1 | 8.8 | 8.1 | 7.8 |

It is shown that the compositions which contain a polyolefin or olefin based copolymer resin possess improved impact strength as measured by Izod impacts and heat distortion temperature in comparison with the control.

EXAMPLES 12-16

Compositions of poly(1,4-butylene terephthalate) (PBT), intrinsic viscosity 1.05 dl/g., melt viscosity 6,200 poise, poly(ethylene terephthalate) (PET), intrinsic viscosity 0.62 dl/g., 3/16 inch glass fibers, α-quartz, a polyolefin or olefin based copolymer resin and diphenyl decyl phosphite are compounded, extruded, pelletized and molded as in Examples 1-11. The formulations and physical properties are summarized in Table 2.

TABLE 2.

| EXAMPLE NO. | 12 | 13 | 14 | 15 | 16 |
|---|---|---|---|---|---|
| Composition (parts by weight) | | | | | |
| PBT | 42.5 | 40 | 42.5 | 42.5 | 45 |
| PET | 30 | 30 | 30 | 30 | 30 |
| Glass fibers, 3/16" | 12.5 | 12.5 | 12.5 | 12.5 | 12.5 |
| α Quartz$^f$ | 12.5 | 12.5 | 12.5 | 12.5 | 12.5 |
| Polyethylene$^g$ | 2.5 | 5 | — | — | — |

TABLE 2.-continued

| EXAMPLE NO. | 12 | 13 | 14 | 15 | 16 |
|---|---|---|---|---|---|
| Polyethylene[h] | — | — | 2.5 | — | — |
| Propylene-ethylene copolymer[i] | — | — | — | 2.5 | 5 |
| [g]p=0.924, MI=5 | | | | | |
| [h]p=0.923, MI=260 | | | | | |
| [i]p=0.895, MI=2.5 | | | | | |
| [j]Novaculite, about 1-10 micron Platelets | | | | | |
| Properties | | | | | |
| Heat Distortion Temp., ° F. at 264 psi | 248 | 241 | 304 | 286 | 318 |
| Notched Izod impact, ft.lbs./in. | 1.0 | 1.0 | 0.9 | 0.9 | 0.9 |
| Unnotched Izod impact, ft.lbs./in. | 7.0 | 6.1 | 7.7 | 8.2 | 7.4 |

Obviously, other modifications and variations of the present invention are possible in the light of the above teachings. It is therefore, to be understood that changes may be made in the particular embodiments described above which are within the full intended scope of the invention as defined in the appended claims.

We claim:

1. A thermoplastic composition having improved impact strength after molding, said composition comprising:
    (a) a thermoplastic polyester composition comprising, in intimate admixture, a poly(1,4-butylene terephthalate) resin, a poly(ethylene terephthalate) resin and a reinforcing amount of a reinforcing agent therefor comprising fibrous glass alone or in combination with a mineral reinforcing filler, and
    (b) a minor amount of up to 5% by weight of (a) and (b) an impact modifier therefor comprising a polyolefin or olefin based copolymer resin, said resin being present in an amount at least sufficient to provide improved impact strength in comparison with a corresponding composition which does not contain said polyolefinic resin.

2. A composition as defined in claim 1 wherein said polyolefin or olefin based copolymer is selected from (i) polyethylene; (ii) propylene-ethylene copolymer; (iii) ethylene-vinyl acetate copolymer; or (iv) a mixture of any of the foregoing.

3. A composition as defined in claim 1 wherein the polyolefin or olefin based copolymer resin is present in an amount of at least about 1.0% by weight of (a) and (b).

4. A composition as defined in claim 1 wherein the polyolefin or olefin based copolymer resin is present in an amount of from about 1 to about 5% by weight of (a) and (b).

5. A composition as defined in claim 1 wherein the reinforcing agent comprises from about 1 to about 60% by weight of fibrous glass and from 0 to about 60% by weight of a mineral reinforcing filler.

6. A composition as defined in claim 1 wherein said polyester resins have an intrinsic viscosity of at least about 0.4 deciliters/gram when measured in a solution in a 60:40 mixture of phenol and trichloroethane at 30° C.

7. A composition as defined in claim 6 wherein said polyesters have an intrinsic viscosity of at least about 0.6 deciliters per gram when measured in a solution in a 60:40 mixture of phenol and trichloroethane at 30° C.

8. A composition as defined in claim 1 wherein said poly(1,4-butylene terephthalate) resin is linear or branched.

9. A composition as defined in claim 8 wherein said branched polyester is a high melt viscosity (1,4-butylene terephthalate) resin which includes a small amount of branching component containing at least three ester forming groups.

10. A composition as defined in claim 1 wherein said mineral reinforcing filler is talc.

11. A composition as defined in claim 1 wherein said mineral reinforcing filler is α-quartz.

12. A thermoplastic composition having improved impact strength after molding, said composition comprising:
    (a) a thermoplastic polyester composition comprising, in intimate admixture, a poly(1,4-butylene terephthalate) resin, a poly(ethylene terephthalate) resin and a reinforcing agent therefor comprising fibrous glass in combination with talc, and
    (b) from about 1.0 to about 5% by weight of (a) and (b) of (i) polyethylene; (ii) propylene-ethylene copolymer; or (iii) ethylene-vinyl acetate copolymer.

13. A thermoplastic composition having improved impact strength after molding, said composition comprising:
    (a) a thermoplastic polyester composition comprising, in intimate admixture, a poly(1,4-butylene terephthalate) resin, a poly(ethylene terephthalate) resin and a reinforcing agent therefor comprising fibrous glass in combination with α-quartz, and
    (b) from about 1.0 to about 5% by weight of (a) and (b) of (i) polyethylene; or ethylene-propylene copolymer.

* * * * *

UNITED STATES PATENT AND TRADEMARK OFFICE
CERTIFICATE OF CORRECTION

PATENT NO. : 4,122,061
DATED : October 24, 1978
INVENTOR(S) : Frederick Frank Holub and Phillip Steven Wilson It is certified that error appears in the above-identified patent and that said Letters Patent are hereby corrected as shown below:

Col. 1, line 38, instead of "is", insert therefor -- in --;

line 50, delete "in";

Col. 2, line 8, instead of "60:20", insert therefor -- 60:40 --;

Col. 4, line 25/26, after "520°F." insert -- in an extruder. The extrudate is pelletized and injection molded at 520°F. --; and Col. 6, line 21, after "of" insert -- a --.

Signed and Sealed this

Twentieth Day of November 1979

[SEAL]

Attest:

RUTH C. MASON
Attesting Officer

LUTRELLE F. PARKER
Acting Commissioner of Patents and Trademarks